United States Patent
Coffey et al.

(10) Patent No.: US 6,993,610 B2
(45) Date of Patent: Jan. 31, 2006

(54) DATA STORAGE SYSTEM HAVING TWO DISK DRIVE CONTROLLERS EACH HAVING TRANSMIT AND RECEIVE PATH CONNECTED IN COMMON TO SINGLE PORT OF DISK DRIVE VIA BUFFER OR MULTIPLEXER

(75) Inventors: Aedan Diarmuid Cailean Coffey, Kilkenny (IE); Timothy James Symons, Waratah (IE); Hans O'Sullivan, Glen Cottage (IE); Derek Christopher Harnett, Stillorgan (IE)

(73) Assignee: Richmount Computers Limited, Dublin (IE)

( * ) Notice: Subject to any disclaimer, the term of this patent is extended or adjusted under 35 U.S.C. 154(b) by 445 days.

(21) Appl. No.: 10/091,978

(22) Filed: Mar. 5, 2002

(65) Prior Publication Data

US 2002/0159311 A1 Oct. 31, 2002

(30) Foreign Application Priority Data

Apr. 26, 2001 (IE) .......................................... S2001/0416
Aug. 24, 2001 (IE) .......................................... S2001/0783

(51) Int. Cl.
*G06F 3/00* (2006.01)
*G06F 13/00* (2006.01)
*H02H 3/05* (2006.01)

(52) U.S. Cl. ............................ 710/74; 710/38; 710/33; 710/31; 710/72; 710/100; 714/5; 714/6

(58) Field of Classification Search ............. 710/14–18, 710/38, 100; 714/5, 6, 42, 44
See application file for complete search history.

(56) References Cited

U.S. PATENT DOCUMENTS

| | | | |
|---|---|---|---|
| 4,747,047 A * | 5/1988 | Coogan et al. ................ 710/38 |
| 4,817,147 A * | 3/1989 | Gorniak et al. ............. 380/266 |
| 5,155,845 A * | 10/1992 | Beal et al. ...................... 714/6 |
| 5,183,749 A | 2/1993 | Ramos et al. |
| 5,313,369 A | 5/1994 | Lewis et al. |
| 5,483,423 A | 1/1996 | Lewis et al. |
| 5,487,160 A * | 1/1996 | Bemis ......................... 711/114 |
| 5,701,513 A * | 12/1997 | Kaneko ......................... 710/6 |
| 5,790,782 A | 8/1998 | Martinez et al. |
| 5,814,762 A | 9/1998 | Tusler et al. |
| 5,829,048 A * | 10/1998 | Ofer et al. .................. 711/166 |
| 5,867,640 A * | 2/1999 | Aguilar et al. ................. 714/6 |
| 5,892,973 A | 4/1999 | Martinez et al. |
| 5,956,665 A | 9/1999 | Martinez et al. |
| 6,050,658 A | 4/2000 | O'Sullivan et al. |
| 6,061,244 A | 5/2000 | O'Sullivan et al. |
| 6,115,814 A | 9/2000 | Lieber et al. |
| 6,154,850 A * | 11/2000 | Idleman et al. ................. 714/5 |
| 6,188,973 B1 | 2/2001 | Martinez et al. |
| 6,260,120 B1 * | 7/2001 | Blumenau et al. .......... 711/152 |
| 6,370,605 B1 * | 4/2002 | Chong, Jr. ................... 710/33 |
| 6,532,547 B1 * | 3/2003 | Wilcox .......................... 714/5 |
| 6,542,961 B1 * | 4/2003 | Matsunami et al. ........ 711/114 |

(Continued)

FOREIGN PATENT DOCUMENTS

WO      WO 03/091887 A1      11/2003

OTHER PUBLICATIONS

IBM–Technical Disclosure Bulletin, Fault Tolerant Architecture for Communication Adapters and Systems, Dec. 1992, vol. 35, Issue 7, pp. 300–303.*

*Primary Examiner*—Tammara Peyton
(74) *Attorney, Agent, or Firm*—Oppedahl & Larson LLP

(57) ABSTRACT

A data storage apparatus arranged to provide redundancy in a storage enclosure containing multiple Serial ATA disk drives is disclosed. The apparatus comprises at least one disk drive of a kind having a single port for the input and output of serial data and at least two disk drive controllers each having data transmit and receive paths connected in common to the single port. The apparatus then switches control to either controller if the other should fail.

6 Claims, 5 Drawing Sheets

U.S. PATENT DOCUMENTS

| | | | |
|---|---|---|---|
| 6,578,158 B1 * | 6/2003 | Deitz et al. ................... | 714/11 |
| 6,658,504 B1 | 12/2003 | Lieber et al. | |
| 2002/0004342 A1 | 1/2002 | Mullins et al. | |
| 2002/0008427 A1 | 1/2002 | Mullins et al. | |
| 2002/0010883 A1 | 1/2002 | Coffey et al. | |
| 2002/0043877 A1 | 4/2002 | Mullins et al. | |
| 2002/0044561 A1 | 4/2002 | Coffey | |
| 2002/0044562 A1 | 4/2002 | Killen, Jr. et al. | |
| 2002/0046276 A1 | 4/2002 | Coffey et al. | |
| 2002/0054477 A1 | 5/2002 | Coffey et al. | |
| 2002/0129182 A1 | 9/2002 | Coffey | |
| 2002/0129232 A1 | 9/2002 | Coffey | |
| 2002/0159311 A1 * | 10/2002 | Coffey et al. ............... | 365/200 |
| 2003/0056048 A1 | 3/2003 | Mullins et al. | |

* cited by examiner

DATA STORAGE SYSTEM HAVING TWO DISK DRIVE CONTROLLERS EACH HAVING TRANSMIT AND RECEIVE PATH CONNECTED IN COMMON TO SINGLE PORT OF DISK DRIVE VIA BUFFER OR MULTIPLEXER

FIELD OF THE INVENTION

The present invention relates to data storage apparatus, particularly but not exclusively apparatus arranged to provide redundancy in a storage enclosure containing multiple Serial ATA disk drives. In this connection it is to be understood that a storage enclosure is a rack containing multiple disk drives for the bulk storage of data.

BACKGROUND OF THE INVENTION

Serial ATA is an emerging disk connection standard, designed to replace the ATA connection inside standard personal computers (PCs). ATA is also known as Integrated Drive Electronics (IDE).

FIG. 1 shows a conventional connection between a host 10 (e.g. PC, RAID controller or disk drive controller) and a Serial ATA disk drive 12. There are two serial data paths, one sending commands and data from the host to the drive (transmit path 14), and one sending commands and data in the reverse direction (receive path 16). Each data path comprises a differential pair of signals.

It will be noted that if the host or disk controller 10 fails then it is not possible to access the data on the disk drive 12.

Unlike Fibre Channel disk drives, serial ATA drives do not have redundant ports as they only have one port to connect to the host or disk controller. Since there is only one port and since serial ATA connections are point to point links there is no option for redundant paths to the disk drive.

Some solutions to this problem include:

Making a Serial ATA disk drive with two ports; however, this requires an expensive customised disk with a non-standard connector; or Mirroring the data on all Serial ATA disk drives so that there is a redundant path to the data rather than the disk; however, this requires twice the number of disk drives.

DISCLOSURE OF THE INVENTION

Accordingly, the present invention provides data storage apparatus comprising at least one disk drive of a kind having a single port for the input and output of serial data, at least two disk drive controllers each having data transmit and receive paths connected in common to the single port, and means for switching control to either controller if the other should fail.

Preferably the transmit paths of the controllers are connected to the disk drive via respective inputs of a first changeover switching device.

In one embodiment the transmit path of a first controller is connected to the respective input of the first changeover switching device via an input of a second changeover switching device, and wherein the receive path of the second controller is connected to the second controller via another input of the second changeover switching device.

Alternatively, the receive paths of the controllers are connected to the respective controllers via a buffer.

In another embodiment the switching is effected solely by software in the controllers.

The disk drive(s) are preferably serial ATA device(s)

In one embodiment a redundant path is provided by the addition of some low cost chips housed on a circuit board in a Serial ATA storage enclosure. Preferably, the circuit board comprises a printed circuit board arranged to attach to the rear of the disk drive.

Potentially all Serial ATA storage enclosures could use this invention. However, the invention is not restricted to use within a storage enclosure; for example, it could be used within a server. Modern servers can have several disk drives (e.g. 8) within the server box. The invention can also be used with individual disk drives.

BRIEF DESCRIPTION OF THE DRAWINGS

Embodiments of the invention will now be described with reference to the accompanying drawings, in which.

DESCRIPTION OF THE PREFERRED EMBODIMENTS

When describing embodiments of the invention, it will be noted that, for clarity, all the figures only show a single disk drive, while in reality there would be many drives in the case of storage enclosures.

Figure 1:
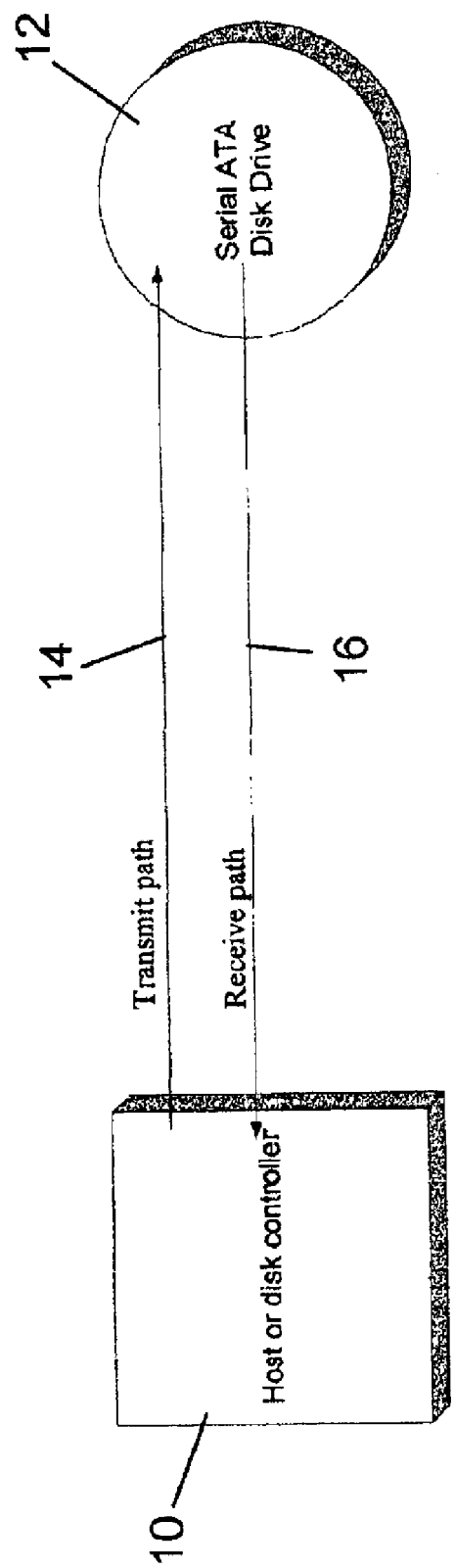
FIG. 1 shows a conventional connection between a host and a Serial ATA disk drive.
Figure 2:
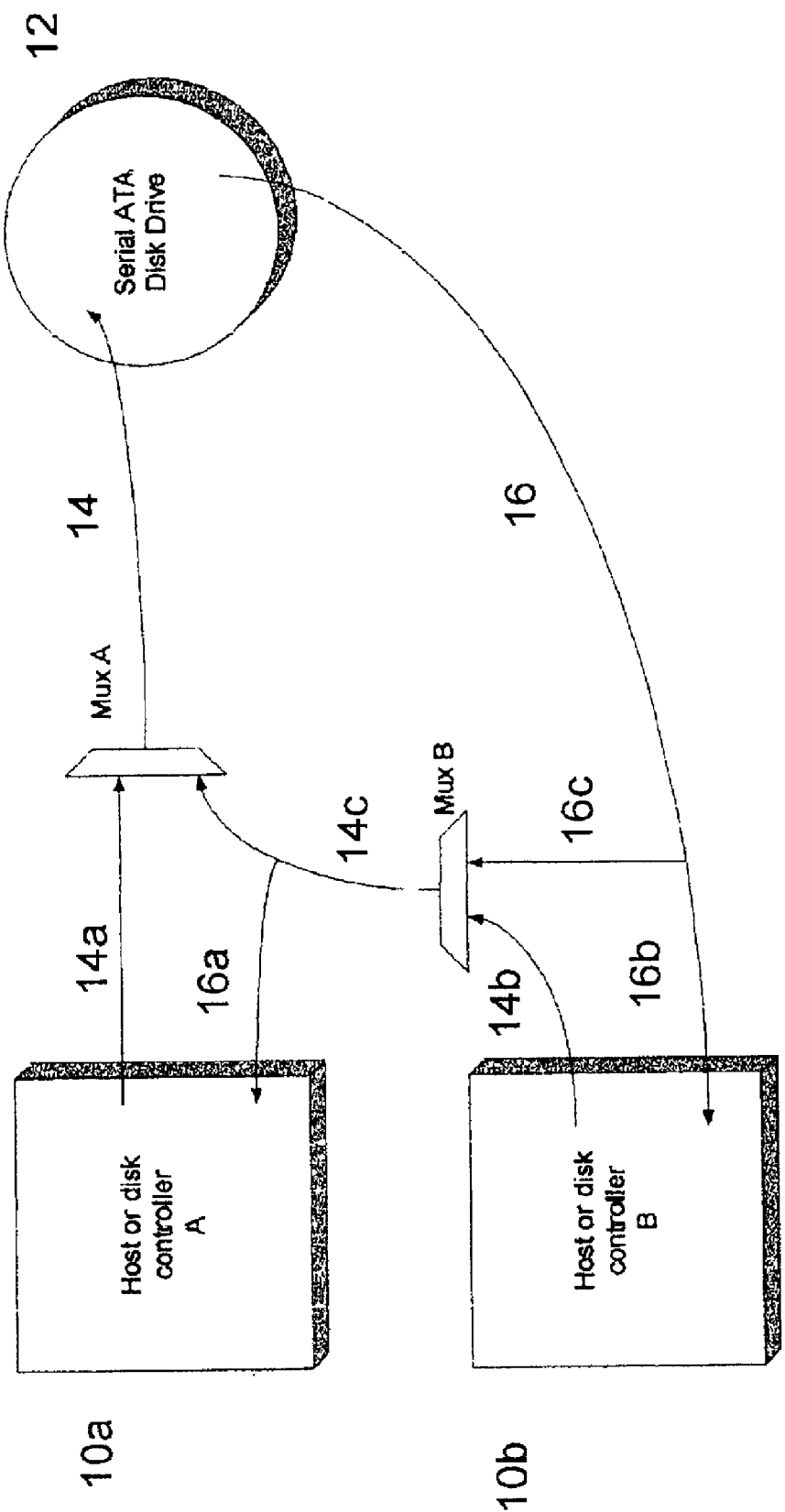
FIG. 2 shows a first embodiment of redundant connection according to the invention.

Referring now to the embodiment of FIG. 2, two disk drive controllers 10a, 10b are connected in common to the single port of the Serial ATA disk drive 12 (the disk drive controllers 10a, 10b may be dedicated controllers or host PCs which perform a disk drive control function among other functions). These controllers may be fixed or removable. Their transmit paths are indicated by the arrows pointing towards the disk drive 12 and the receive paths are indicated by the arrows pointing away from the disk drive. If one controller fails then the data on the disk can be accessed by the other. This is effected as follows.

The transmit path of the first controller 10a is connected to the disk drive 12 via a respective input of a multiplexer Mux A acting as a changeover switch. Thus the transmit path of the first controller 10a is 14a/14. The transmit path of the second controller 10b is via a respective input of a second multiplexer Mux B, also acting as a changeover switch, and the other input of the first multiplexer Mux A. The transmit path of the second controller is thus 14b/14c/14. The receive path of the first controller is via the other input of the second multiplexer Mux B; thus its receive path is 16/16c/14c/16a. Finally, the receive path of the second controller 10b is direct, i.e. 16/16b.

When the controller 10a is active multiplexer Mux A is configured to send data from Host A to the disk drive 12, and multiplexer Mux B is configured to send data from the drive back to Host A. When Host B is active multiplexer Mux B is configured to send data from Host B to multiplexer Mux A and multiplexer Mux A is configured to send the data to the drive. Thus a malfunctioning host can be bypassed completely.

Controllers 10A and 10B communicate in any suitable manner (e.g. RS232, Ethernet) to agree which of them is going to communicate with the disk drive at any given time. A redundant scheme exists between the controllers to allow them to operate in a highly available manner, including, for example, the so-called STOMITH (Shoot The Other Machine In The Head) method.

The two controllers jointly control Mux A and Mux B in such a manner that if controller 10a is not present or is not working properly then multiplexer Mux A and multiplexer Mux B are switched so as to put controller 10b in control of the drive, and vice versa. This can be achieved using signals from the controllers in conjunction with pull-up or pull-down resistors. (Note that when controller 10a is using the STOMITH feature to reset controller 10b then the latter's Mux control lines must be set into a benign state when in reset.)

Figure 3:
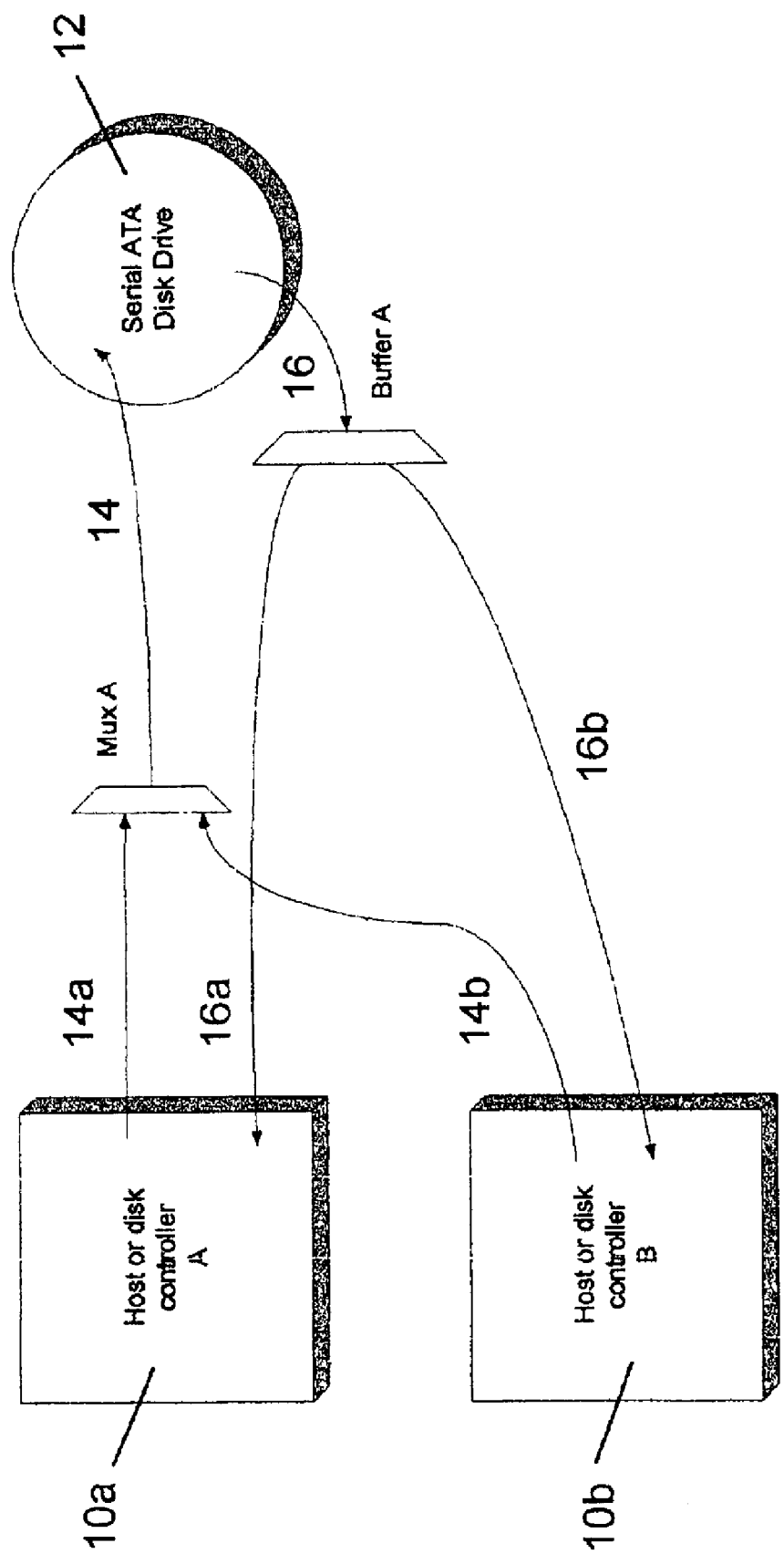
FIG. 3 shows a second embodiment of redundant connection according to the invention.

Referring now to the embodiment of FIG. 3, in this case the data from the disk drive 12 is fed to both controllers via a buffer Buffer A. In certain controlled situations the buffer may not be necessary but is shown here for completeness. Both controllers receive the data from the disk drive but the inactive one ignores it. It should be noted that in this case, one multiplexer, Mux A, is still required to connect the correct controller to the disk drive 12 on the transmit path.

Figure 4:
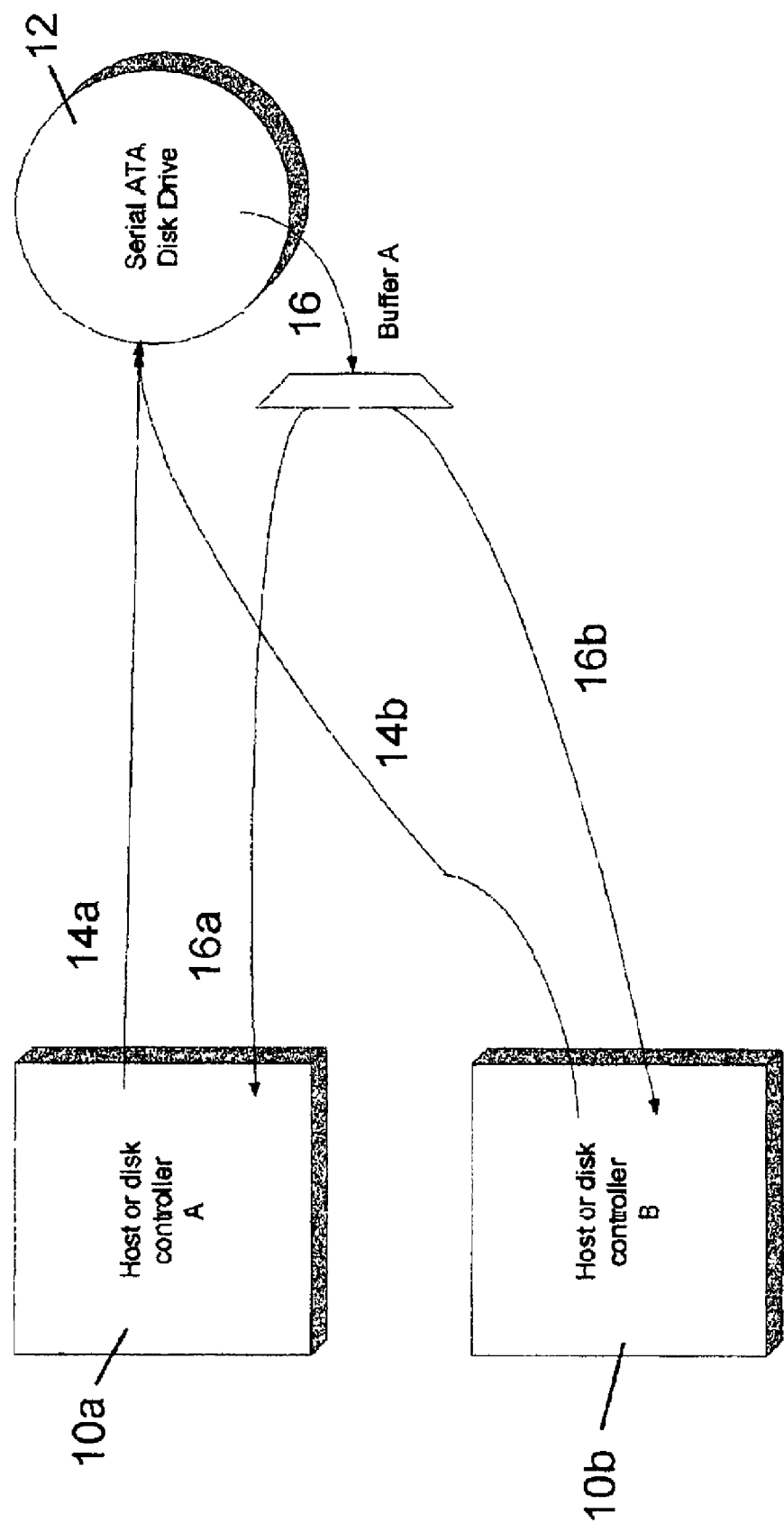
FIG. 4 shows a third embodiment of redundant connection according to the invention.

Referring now to the embodiment of FIG. 4, in this case the transmit path of two controllers are connected together and jointly connected to the disk drive 12. System software controls access to the disk drive and prevents both controllers attempting to transmit at the same time. The inactive controller becomes totally passive. Again, in certain controlled situations the buffer may not be necessary but is shown here for completeness. In such a case the FIG. 4 embodiment may not require any extra hardware components and thus essentially consists of wiring together what's already there.

The embodiments outlined in FIGS. 2, 3 and 4 could be implemented in several ways; for example, the multiplexers and buffers could be on the controllers, on the backplane of the disk drive or on a small board between the backplane and the disk drive. (Note that the FIG. 4 embodiment may not need any boards at all)

Figure 5:
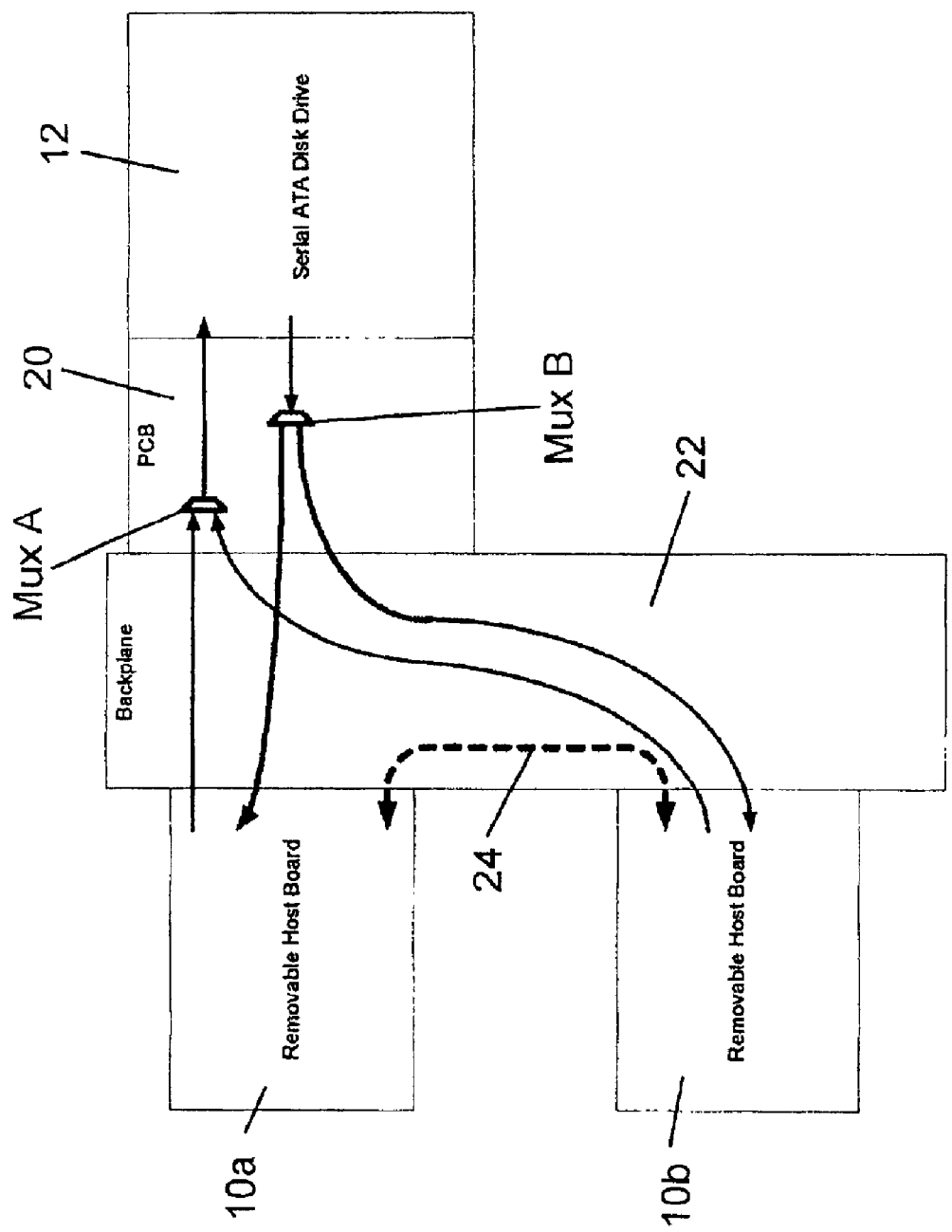
FIG. 5 illustrates a physical implementation of the first embodiment of the invention.

FIG. 5 shows the second embodiment as an example. In FIG. 5 a single disk drive 12 is shown, together with a small PCB 20 which is mounted on the rear of it. When the disk drive is removed the PCB comes with it, thus allowing the backplane 22 to be a completely passive board with no active devices on it, thus making it more reliable and easier to service. In this example the controllers 10a, 10b are shown as removable boards. The dashed line 24 indicates the communication between the two controllers, as mentioned above.

The invention is not limited to the embodiments described herein which may be modified or varied without departing from the scope of the invention.

What is claimed is:

1. A data storage apparatus comprising:
   a serial ATA disk drive having a first serial data path for the input of serial data and a second serial data path for the output of serial data,
   a first serial ATA disk drive controller having a first serial data path for the input of serial data and a second serial data path for the output of serial data,
   a second serial ATA disk drive controller having a first serial data path for the input of serial data and a second serial data path for the output of serial data,
   a first serial multiplexer with first and second inputs and an output;
   a second serial multiplexer with first and second inputs and an output;
   the output of the first serial multiplexer connectively coupled with the first serial data path of the serial ATA disk drive;
   the second serial data path of the first serial ATA disk drive controller connectively coupled with the first input of the first serial multiplexer;
   the second serial data path of the second serial ATA disk drive controller connectively coupled with the first input of the second serial multiplexer;
   the second serial data path of the serial ATA disk drive connectively coupled with the second input of the second serial multiplexer and with the first serial data path of the second serial ATA disk drive controller; and
   the output of the second serial multiplexer connectively coupled with the first aerial data path of the second serial ATA disk drive controller and with the second input of the first serial multiplexer.

2. A data storage apparatus comprising:
   a serial ATA disk drive having a first aerial data path for the input of serial data and a second serial data path for the output of serial data,
   a first serial ATA disk drive controller having a first serial data path for the input of serial data and a second serial data path for the output of serial data,
   a second serial ATA disk drive controller having a first serial data path for the input of serial data and a second serial data path for the output of serial data,
   a serial multiplexer with first and second inputs and an output;
   a buffer with an input and first and second buffered outputs;
   the output of the first serial multiplexer connectively coupled with the first serial data path of the serial ATA disk drive;
   the second serial data path of the first serial ATA disk drive controller connectively coupled with the first input of the serial multiplexer;
   the second serial data path of the second serial ATA disk drive controller connectively coupled with the second input of the aerial multiplexer;
   the second serial data path of the serial ATA disk drive connectively coupled with the input of the buffer;
   the first output of the buffer connectively coupled with the first serial data path of the first serial ATA disk drive controller; and
   the second output of the buffer connectively coupled with the first serial data path of the second serial ATA disk drive controller.

3. A method for use with a data storage apparatus comprising a serial ATA disk drive having a first serial data path for the input of serial data and a second serial data path for the output of serial data, a first serial ATA disk drive controller having a first serial data path for the input of serial data and a second serial data path for the output of serial data, a second serial ATA disk drive controller having a first serial data path for the input of serial data and a second serial data path for the output of serial data, a first serial multiplexer with first and second inputs and an output, a second serial multiplexer with first and second inputs and an output, the output of the first serial multiplexer connectively coupled with the first serial data path of the serial ATA disk drive, the second serial data path of the first serial ATA disk drive controller connectively coupled with the first input of the first serial multiplexer, the second serial data path of the second serial ATA disk drive controller connectively coupled with the first input of the second serial multiplexer, the second serial data path of the serial ATA disk drive connectively coupled with the second input of the second serial multiplexer and with the first serial data path of the second serial ATA disk drive controller; and the output of the second serial multiplexer connectively coupled with the first serial data path of the second serial ATA disk drive controller and with the second input of the first serial multiplexer, the method comprising the steps, performed in the event of failure of the first serial ATA disk drive controller, of:

connecting the first input of the second serial multiplexer with its output and disconnecting the second input of the second serial multiplexer with its output, and connecting the second input of the first serial multiplexer with its output and disconnecting the first input of the first serial multiplexer with its output.

4. A method for use with a data storage apparatus comprising a serial ATA disk drive having a first serial data path for the input of serial data and a second serial data path for the output of serial data, a first serial ATA disk drive controller having a first serial data path for the input of serial data and a second serial data path for the output of serial data, a second serial ATA disk drive controller having a first serial data path for the input of serial data and a second serial data path for the output of serial data, a first serial multiplexer with first and second inputs and an output, a second serial multiplexer with first and second inputs and an output, the output of the first serial multiplexer connectively coupled with the first serial data path of the serial ATA disk drive, the second serial data path of the first serial ATA disk drive controller connectively coupled with the first input of the first serial multiplexer, the second serial data path of the second serial ATA disk drive controller connectively coupled with the first input of the second serial multiplexer, the second serial data path of the serial ATA disk drive connectively coupled with the second input of the second serial multiplexer and with the first serial data path of the second serial ATA disk drive controller; and the output of the second serial multiplexer connectively coupled with the first serial data path of the second serial ATA disk drive controller and with the second input of the first serial multiplexer, the method comprising the steps, performed in the event of failure of the second serial ATA disk drive controller, of:

connecting the second input of the second serial multiplexer with its output and disconnecting the first input of the second serial multiplexer with its output, and connecting the first input of the first serial multiplexer with its output and disconnecting the second input of the first serial multiplexer with its output.

5. A method for use with a data storage apparatus comprising a serial ATA disk drive having a first serial data path for the input of serial data and a second serial data path for the output of serial data, a first serial ATA disk drive controller having a first serial data path for the input of serial data and a second serial data path for the output of serial data, a second serial ATA disk drive controller having a first serial data path for the input of serial data and a second serial data path for the output of serial data, a serial multiplexer with first and second inputs and an output, a buffer with an input and first and second buffered outputs, the output of the first serial multiplexer connectively coupled with the first serial data path of the serial ATA disk drive, the second serial data path of the first serial ATA disk drive controller connectively coupled with the first input of the serial multiplexer, the second serial data path of the second serial ATA disk drive controller connectively coupled with the second input of the serial multiplexer, the second serial data path of the serial ATA disk drive connectively coupled with the input of the buffer, the first output of the buffer connectively coupled with the first serial data path of the first serial ATA disk drive controller, and the second output or the buffer connectively coupled with the first serial data path of the second serial ATA disk drive controller, the method comprising the step, performed in the event of failure of one of the first and second serial ATA disk drive controllers, of:

as for the serial multiplexer, connecting its input that is connectively coupled with the other of the first and second serial ATA disk drive controllers with its output; and disconnecting its input that is connectively coupled with the failed serial ATA disk drive controllers with its output.

6. A data storage apparatus comprising:

a serial ATA disk drive having a first serial data path for the input of serial data and a second serial data path for the output of serial data, a first serial ATA disk drive controller having a first serial data path for the input of serial data and a second serial data path for the output of serial data, a second serial ATA disk drive controller having a first serial data path for the input of serial data and a second serial data path for the output of serial data, a buffer with an input and first and second buffered outputs;

the second serial data path of the first serial ATA disk drive controller connectively coupled with the first serial data path of the serial ATA disk drive;

the second serial data path of the second serial ATA disk drive controller connectively coupled with the first serial data path of the serial ATA disk drive;

the second serial data path of the serial ATA disk drive connectively coupled with the input of the buffer;

the first output of the buffer connectively coupled with the first serial data path of the first serial ATA disk drive controller, and the second output of the buffer connectively coupled with the first serial data path of the second serial ATA disk drive controller.

* * * * *